US012695354B2

(12) United States Patent
Wu

(10) Patent No.: US 12,695,354 B2
(45) Date of Patent: Jul. 28, 2026

(54) DAMPER DEVICE AND ELECTRONIC APPARATUS

(71) Applicant: Lanto Electronic Limited, Kunshan City (CN)

(72) Inventor: Fu-Yuan Wu, Kunshan City (CN)

(73) Assignee: Lanto Electronic Limited, Kunshan City (CN)

( * ) Notice: Subject to any disclaimer, the term of this patent is extended or adjusted under 35 U.S.C. 154(b) by 374 days.

(21) Appl. No.: 18/595,923

(22) Filed: Mar. 5, 2024

(65) Prior Publication Data

US 2024/0305164 A1 Sep. 12, 2024

(30) Foreign Application Priority Data

Mar. 6, 2023 (CN) .......................... 202310204179.1

(51) Int. Cl.
*H02K 5/24* (2006.01)
*H02K 41/035* (2006.01)
(52) U.S. Cl.
CPC ........... *H02K 5/24* (2013.01); *H02K 41/0354* (2013.01)
(58) Field of Classification Search
CPC ........ H02K 5/24; H02K 41/0354; G02B 7/09; G02B 27/64; G02B 27/646
See application file for complete search history.

(56) References Cited

U.S. PATENT DOCUMENTS

| | | | | |
|---|---|---|---|---|
| 11,119,333 | B2 * | 9/2021 | Miller | H04N 23/51 |
| 2024/0305162 | A1 * | 9/2024 | Hsu | H02K 5/24 |
| 2025/0167626 | A1 * | 5/2025 | Chang | H02K 5/24 |
| 2025/0183753 | A1 * | 6/2025 | Hsu | H02K 5/24 |

FOREIGN PATENT DOCUMENTS

| | | |
|---|---|---|
| CN | 110955011 A | 4/2020 |
| CN | 111555537 A | 8/2020 |
| CN | 212278047 U | 1/2021 |
| CN | 212483956 U | 2/2021 |
| CN | 212781457 U | 3/2021 |
| CN | 215642186 U | 1/2022 |
| CN | 220015929 U | 11/2023 |
| JP | H0643383 U | 6/1994 |
| JP | 2004301296 A | 10/2004 |
| KR | 20110002671 A | 1/2011 |
| KR | 20160014396 A | 2/2016 |
| TW | M647882 U | 11/2023 |

OTHER PUBLICATIONS

Office Action of CN Application No. 2023102041791 and English translation, dated Nov. 14, 2025, 20 pages.

* cited by examiner

*Primary Examiner* — Christopher P Schwartz
(74) *Attorney, Agent, or Firm* — MUNCY, GEISSLER, OLDS & LOWE, P.C.

(57) ABSTRACT

A damper device includes a first motion component and a base. The first motion component includes a first damper part, and the cross section of the first damper part includes a first circular arc edge. The base includes a first gel, and the base is correspondingly disposed with the first motion component. The terminal of the first damper part is inserted into the first gel. The first motion component is configured to drive the first damper part to move along the radial direction of the first damper part relative to the first gel, and the first circular arc edge faces the moving direction of the first damper part. The damper device solves the problem that keeping the damping pin bonding to the gel is not easy.

13 Claims, 6 Drawing Sheets damper device 1 electronic apparatus 7

FIG. 10

DAMPER DEVICE AND ELECTRONIC APPARATUS

FIELD OF THE INVENTION

The present disclosure relates to a damper, and particularly relates to a damper device and an electronic apparatus.

BACKGROUND OF THE INVENTION

During work, micro motion mechanism (e.g., voice coil motor) would generate unnecessary motion after the micro motion mechanism undergoes external stimulation or external interference (e.g., shaking). In order to reduce the effect of the external interference which the micro motion mechanism undergoes, a damper may be disposed in the micro motion mechanism to lower the frequency response of the micro motion mechanism to the external interference.

For example, the damper may include a damping pin and a gel, and the damping pin moves in the gel and remains bonding to the gel to lower the frequency response of the micro motion mechanism to the external interference. However, because the cross section of the existing damping pin is a rectangle, there are sharp edges and angles in surroundings of the existing damping pin. The sharp edges and angles would break the gel when the damping pin moves, and the bonding force between the damping pin and gel would decrease after the gel is broken such that keeping the damping pin bonding to the gel is not easy. Hence, the existing damping pin has the problem that keeping the damping pin bonding to the gel is not easy.

SUMMARY OF THE INVENTION

The object of the present disclosure is to provide a damper device for a voice coil motor which solves the problem that keeping the damping pin bonding to the gel is not easy. The damper device includes a first motion component and a base. The first motion component includes a first damper part, and the cross section of the first damper part includes a first circular arc edge. The base includes a first gel and is correspondingly disposed with the first motion component. The terminal of the first damper part is inserted into the first gel, the first motion component is configured to drive the first damper part to move along the radial direction of the first damper part relative to the first gel, and the first circular arc edge faces the moving direction of the first damper part.

In some embodiments, the cross section of the first damper part further includes a first straight edge which connected to the first circular arc edge.

In some embodiments, a number of the first straight edges is four, a number of the first circular arc edges is four, and the four first straight edges and the four first circular arc edges are connected alternately in order to form the cross section of the first damper part.

In some embodiments, the cross section of the first damper part defines a first incircle, the circumference of the first incircle is less than the circumference of the cross section of the first damper part, and the first incircle is tangential to the four first straight edges.

In some embodiments, the first damper part includes an arc terminal, and the arc terminal is located on the end of the first damper part in an axial direction. The arc terminal is inserted into the first gel and faces the axial direction of the first damper part.

In some embodiments, the damper device further includes a frame and a second motion component. The frame includes a second damper part, and the cross section of the second damper part includes a second circular arc edge. The second motion component includes a second gel and is correspondingly disposed with the frame. The terminal of the second damper part is inserted into the second gel, the second motion component is configured to drive the second gel to move along the axial direction of the second damper part relative to the second damper part, and the second circular arc edge faces the moving direction of the first damper part.

In some embodiments, the cross section of the second damper part further includes a second straight edge which connected to the second circular arc edge.

In some embodiments, a number of the second straight edges is four, a number of the second circular arc edges is four, and the four second straight edges and the four second circular arc edges are connected alternately in order to form the cross section of the second damper part.

In some embodiments, the cross section of the second damper part defines a second incircle, the circumference of the second incircle is less than the circumference of the cross section of the second damper part, and the second incircle is tangential to the four second straight edges.

In some embodiments, the frame further includes a frame body and a second holder. The frame body encloses the second motion component. The second holder is connected to the frame body and another terminal of the second damper part.

In some embodiments, a number of the second damper parts is two, and the two second damper parts are disposed at intervals on the second holder.

In some embodiments, a number of the second holders is two, and the two second holders are respectively disposed on two sides of the frame body.

The present disclosure provides an electronic apparatus including the aforementioned damper device.

The beneficial effect of the present disclosure: the first damper part is disposed on the first motion component, and the first circular arc edge is disposed on the cross section of the first damper part. The first gel is disposed on the base, the base is correspondingly disposed with the first motion component, the terminal of the first damper part is inserted into the first gel, the first motion component is configured to drive the first damper part to move along the radial direction of the first damper part relative to the first gel, and the first circular arc edge (from the view of the cross section of the first damper part, the first circular arc edge is an arc shape; from the view of the whole of the first damper part, the first circular arc edge forms an arc surface) faces the moving direction of the first damper part. When the first damper part moves in the first gel, because the first circular arc edge is not sharp, the first circular arc edge does not break the first gel when having contact with the first gel so that keeping the first damper part bonding to the first gel is easier.

The aforementioned description of the present disclosure is merely the outline of the technical solutions of the present disclosure. In order to understand the technical solutions of the present disclosure clearly and to implement the present disclosure according to the content of the specification. The better embodiments of the present disclosure given herein below with accompanying drawings are used to describe the present disclosure in detail.

THE DRAWINGS

FIG. 10 is a block diagram of an electronic apparatus according to another embodiment of the present disclosure.

DETAILED DESCRIPTION

The specific embodiments of the present disclosure given herein below is used to explain the implementation of the present disclosure. A person skilled in the art easily understands the advantages and the effects of the present disclosure from the content of the present disclosure.

It should be noted that the embodiments and the features in the embodiments of the present disclosure can be combined with each other without conflict. The present disclosure will be described in detail below with reference to accompanying drawings and in conjunction with the embodiments. In order to provide those in the art with better understanding of the solution of the disclosure, the technical solutions in the embodiments of the present disclosure will be described clearly and completely below in conjunction with the accompanying drawings in the embodiments of the present disclosure. Apparently, the described embodiments are merely a part of the embodiments of the present disclosure and not all embodiments of the present disclosure. Based on the embodiments of the present disclosure, all other embodiments obtained by a person skilled in the art shall fall within the scope of protection of the present disclosure.

It should be noted that the terms "first", "second", etc. in the specification and claims of the present disclosure and in the aforementioned accompanying drawings are used to distinguish similar objects and need not be used to describe a particular order or sequence. Furthermore, the terms "comprising" and "having", and any variation thereof, are intended to encompass a non-exclusive inclusion, for example, a series of steps or units comprising processes, methods, systems, products or equipment need not be limited to those steps or units clearly listed but may include other steps or units not clearly listed or inherent to those processes, methods, products or equipment.

It should be noted that the terms "mount", "connect", "link" should be broadly interpreted, for example, may be a permanent connection, may be a dismountable connection or may be an integral connection; may be a mechanical connection or may be an electrically connection; may be a direct connection, may be a connection by intermediate mediums, or may be an interior connection between two components. For a person skilled in the art, the meaning of the aforementioned terms in the present disclosure may be understood upon specific situations.

Figure 1:
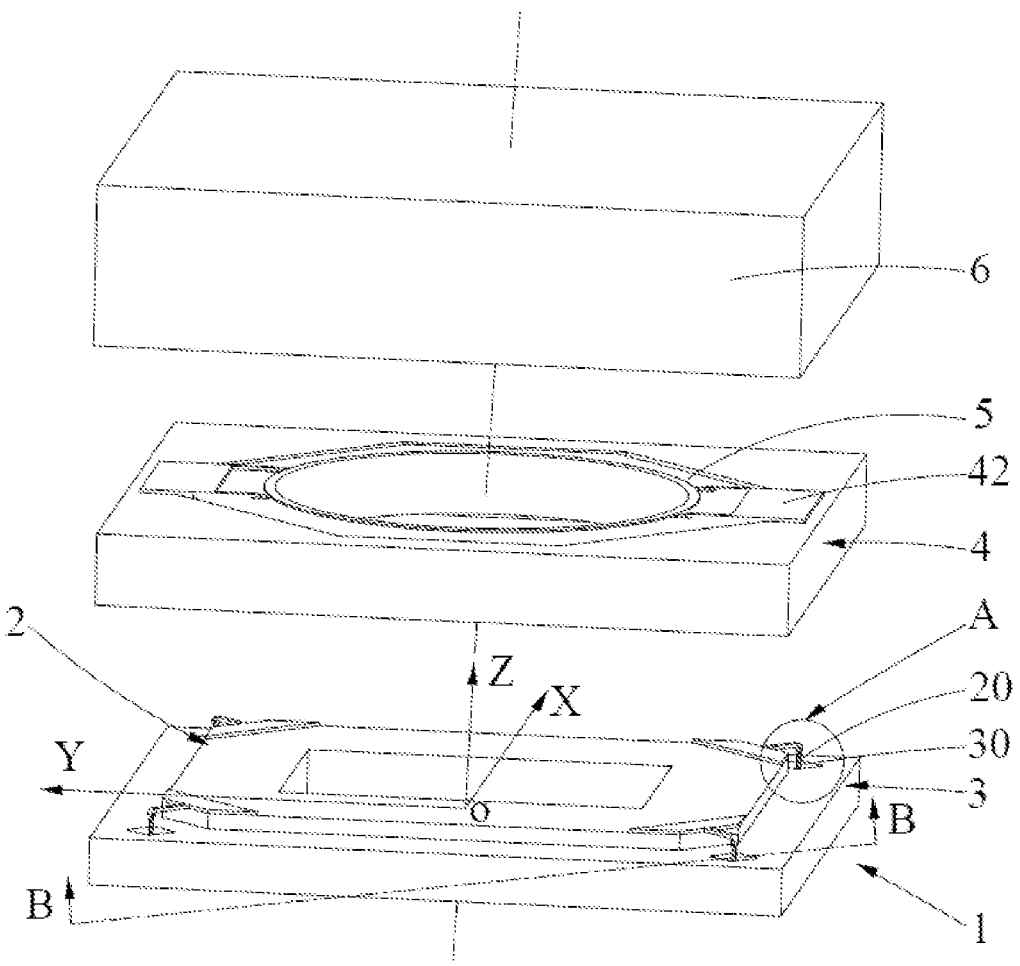
FIG. 1 is an exploded view diagram of a damper device according to one embodiment of the present disclosure.
Figures 2, 3:
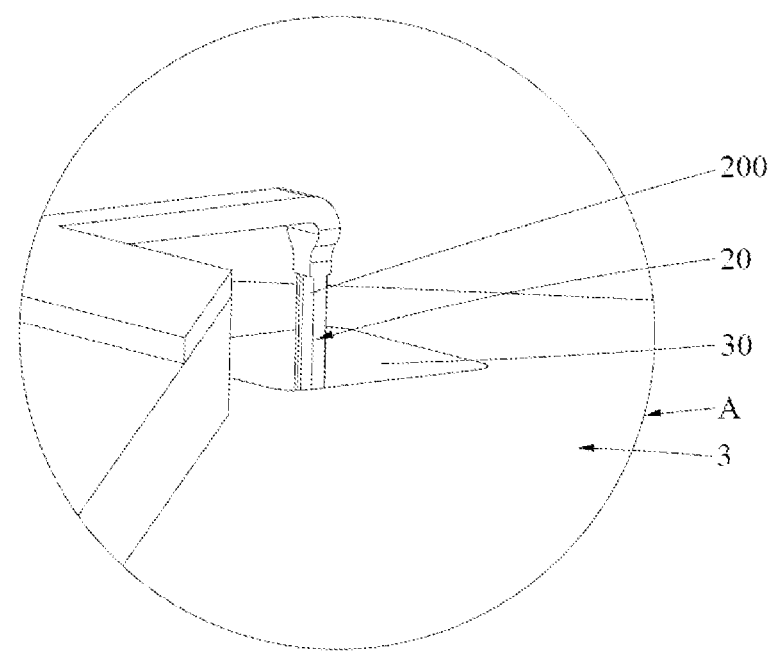
FIG. 2 is an enlarged view diagram of A direction in FIG. 1 according to one embodiment of the present disclosure.
FIG. 3 is a partial cross section view diagram sectioned from B-B line of FIG. 1 according to one embodiment of the present disclosure (merely sectioning a first damper part and regarding the radial direction of the first damper part as the sectioning direction of the B-B line).

Please refer to FIG. 1 and FIG. 2, and the present disclosure in one embodiment provides a damper device 1 for a voice coil motor (VCM) including: a first motion component 2 and a base 3. The first motion component 2 includes a first damper part 20, and the cross section of the first damper part 20 includes a first circular arc edge 200. The base 3 includes a first gel 30 and is correspondingly disposed with the first motion component 2. The terminal of the first damper part 20 is inserted into the first gel 30, the first motion component 2 is configured to drive the first damper part 20 to move along the radial direction of the first damper part 20 relative to the first gel 30, and the first circular arc edge 200 faces the moving direction of the first damper part 20.

For convenience to explain, Cartesian coordinate system O-xyz may be disposed on the base 3 such that original point of the Cartesian coordinate system O-xyz may be located on the center of the base 3, x-axis of the Cartesian coordinate system O-xyz is parallel to the smaller side surface of the base 3, y-axis of the Cartesian coordinate system O-xyz is parallel to the bigger side surface of the base 3, and z-axis of the Cartesian coordinate system O-xyz is vertical to the top surface and the bottom surface of the base 3.

As shown in FIG. 3, preferably, the cross section of the first damper part 20 defines a first incircle 201 (the first incircle 201 in FIG. 3 is shown by a circle formed by a dotted line), and the circumference of the first incircle 201 is less than the circumference of the cross section of the first damper part 20. The first incircle 201 may be a circle with a maximum area formed by rounding and chamfering edges and angles of the cross section of the first damper part 20. The circumference of the first incircle 201 is less than the circumference of the cross section of the first damper part 20 may prevent the first damper part 20 from over rounding and chamfering; in other words, the circumference of the first incircle 201 is equal to or greater than the circumference of the cross section of the first damper part 20 may be avoided. On the contrary, when the circumference of the first incircle 201 is equal to or greater than the circumference of the cross section of the first damper part 20, the sharp edges and angles of the first damper part 20 have been removed by rounding and chamfering to prevent the first damper part 20 from breaking the first gel 30 (the first gel 30 may refer to FIG. 2, similarly hereinafter), but it would cause the circumference of the cross section of the first damper part 20 to be too small (because the circumference of the cross section of the first damper part 20 is too small, from the view of the whole of the first damper part 20, it causes the side surface area of the first damper part 20 to be too small; in other words, it causes the side surface area of the first damper part 20 for contacting the first gel 30 to be too small), and it would further cause the retarding force generated by the first damper part 20 in the first gel 30 to be reduced such that the first motion component 2 (the first motion component 2 may refer to FIG. 1, similarly hereinafter) needs help of other flexible components (e.g., help of connection of springs) to increase the retarding force for meeting requirements and it would make the structure of the damper device 1 (the damper device 1 may refer to FIG. 1) more complicated.

As shown in FIG. 3, preferably, the cross section of the first damper part 20 further includes a first straight edge 202 which connected to the first circular arc edge 200. The first circular arc edge 200 may face a direction parallel to the x-axis or the y-axis. The first circular arc edge 200 may protrude outwards, and for example, the first circular arc edge 200 may protrude in the direction parallel to the x-axis or the y-axis. The number of the first straight edges 202 is four, the number of the first circular arc edges 200 is four, and the four first straight edges 202 and the four first circular arc edges 200 are connected alternately in order to form the cross section of the first damper part 20. From the view of the cross section of the first damper part 20, each of the first straight edges 202 is a line segment; from the view of the whole of the first damper part 20, each of the first straight edges 202 forms a plane. For example, two of the four first straight edge 202 may be parallel to each other, and the other two of the four first straight edge 202 may be parallel to each other. The lengths of the four first circular arc edges 200 are equal, and two terminals of each of the four first circular arc edges 200 may be connected to one first straight edge 202. The first incircle 201 may be tangential to the four first straight edges 202 at the same time. The center of the first incircle 201 may overlap the center of the cross section of the first damper part 20.

Figure 4:
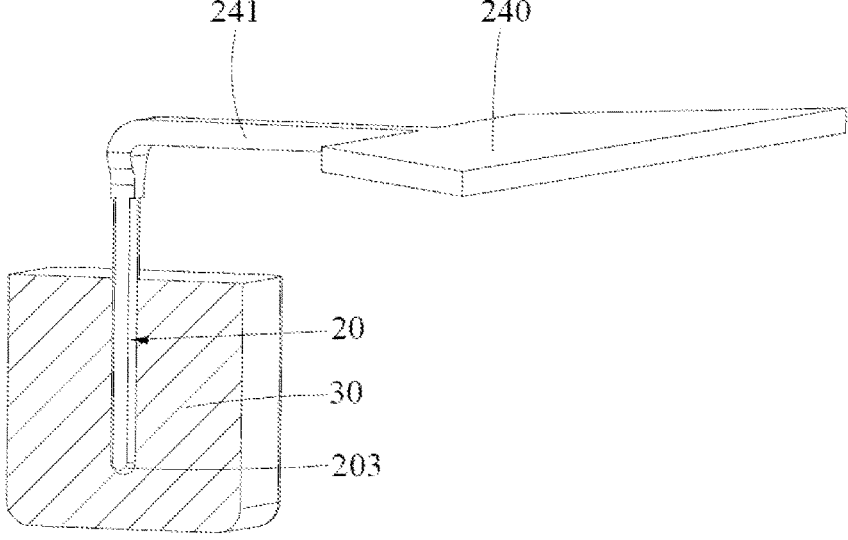
FIG. 4 is a partial cross section view diagram of a first holder, the first damper part and first gel according to one embodiment of the present disclosure (merely sectioning the first gel).

As shown in FIG. 4, the first damper part 20 further includes an arc terminal 203 which may be located on the end of the axial direction of the first damper part 20 and inserted into the first gel 30. The arc terminal 203 faces the axial direction of the first damper part 20. For example, the arc terminal 203 may be located on the bottom of the first damper part 20 and protrudes downward by a shape of a hemispherical surface, and when the first damper part 20 moves, breaking the first gel 30 by the sharp edges and angles on the end of the first damper part 20 may be prevented when the first damper part 20 which of the end has the arc terminal 203 is compared to the first damper part 20 which of the end has no arc surfaces.

Figure 5:
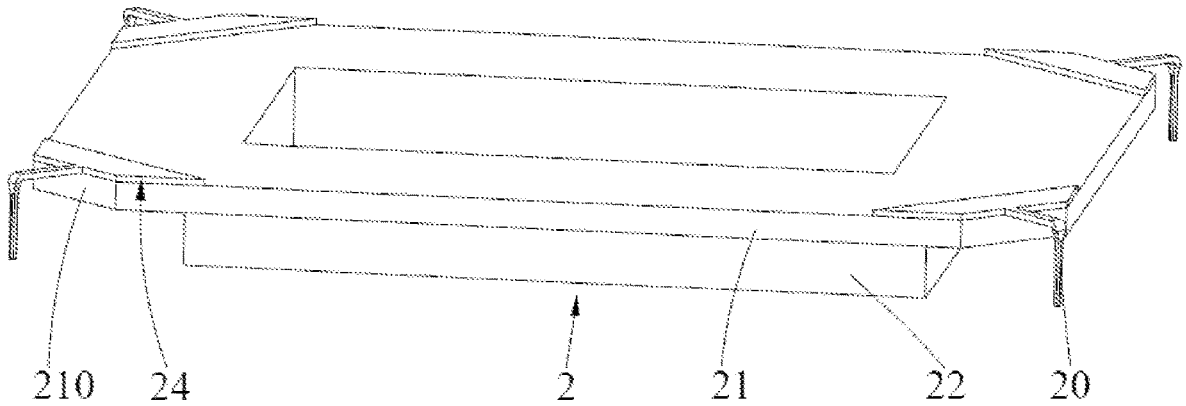
FIG. 5 is a 3D view diagram of a first motion component according to one embodiment of the present disclosure.

As shown in FIG. 5, the first motion component 2 may include a plate 21 and a boss 22 which may be located on the center of the plate 21 and may be integrally formed with the plate 21. For example, the boss 22 may disposed on the center of the lower surface of the plate 21. The first damper part 20 may be shown as columnar and be vertically disposed with the plate 21. The first circular arc edges 200 (the first circular arc edge 200 may refer to FIG. 3, similarly hereinafter) may be the rounded and chamfered edges and angles of the cross section of the corresponding first damper part 20, and for example, the first circular arc edges 200 may be the rounded and chamfered edges on the cross section of the existing rectangle damping pin. Because each of the first circular arc edges 200 on the cross section of the first damper part 20 is a circular like, from the view of the whole of the first damper part 20, each of the first circular arc edges 200 may form a shape with a columnar surface.

Figure 6:
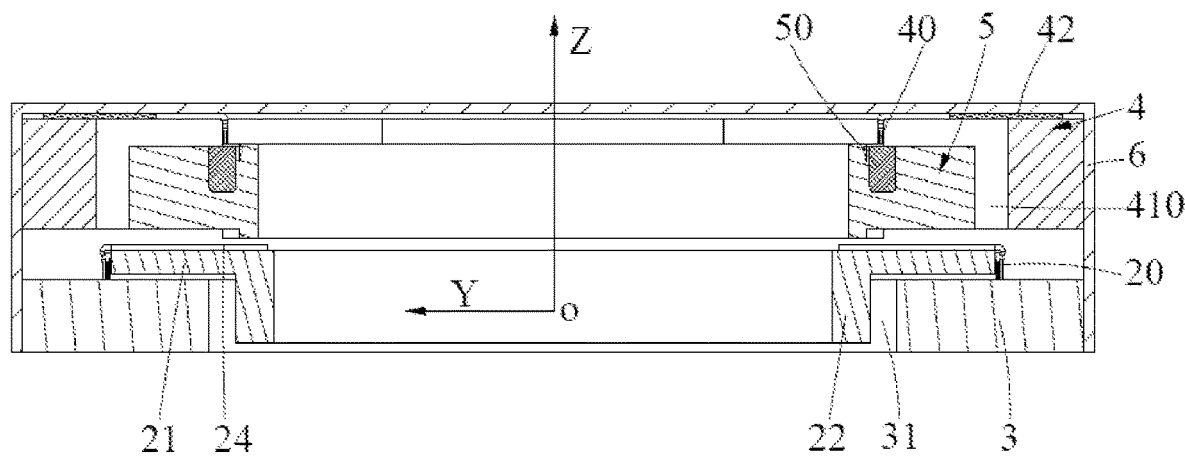
FIG. 6 is a cross section view diagram of a damper device according to one embodiment of the present disclosure.
Figure 7:
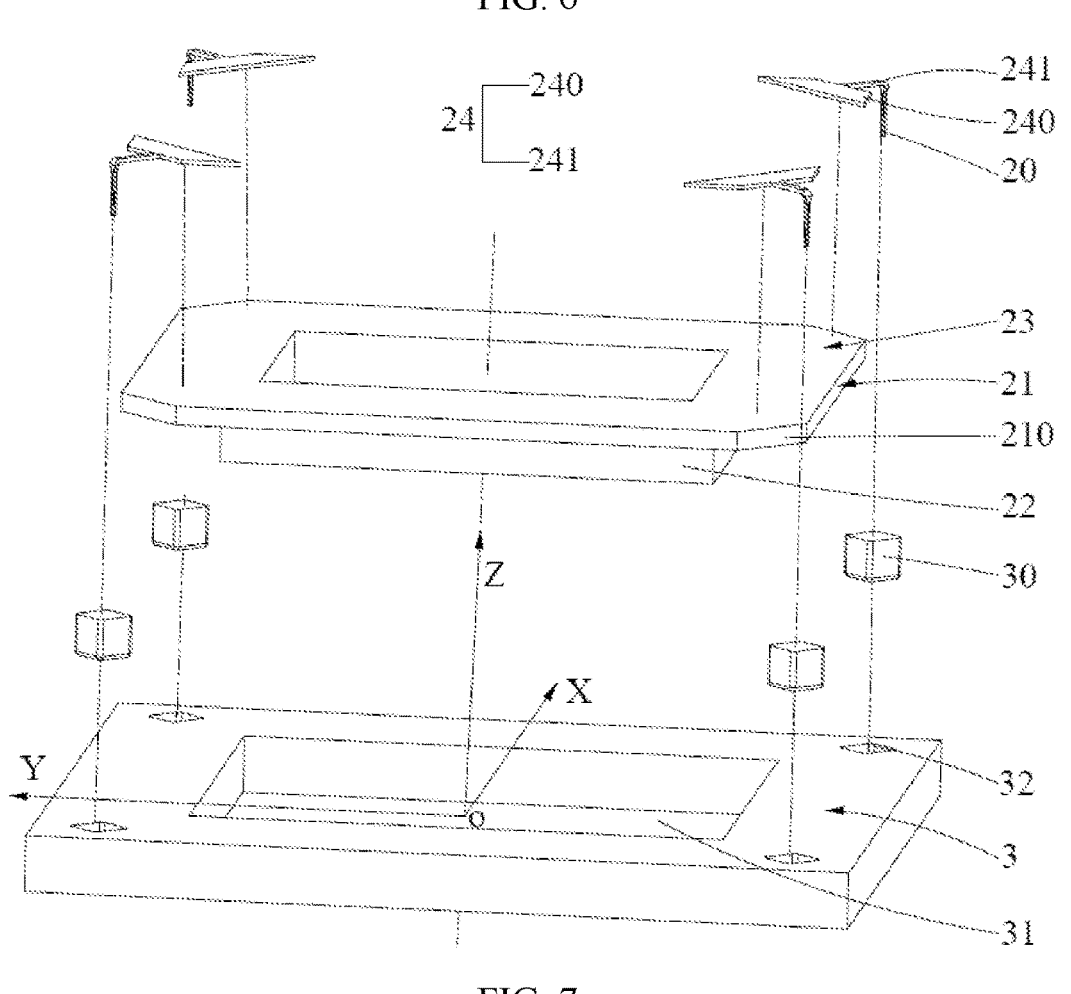
FIG. 7 is an exploded view diagram of a first motion component and a base according to one embodiment of the present disclosure.

Please refer to FIG. 6 and FIG. 7, and the base 3 may be shown as a rectangular cuboid, a rectangle through hole 31 is disposed on the middle of the base 3, and the boss 22 may be embedded in the rectangle through hole 31. Four first damper grooves 32 may be respectively disposed on four corners of the base 3, and the first gels 30 may be disposed in the first damper grooves 32.

Please refer to FIG. 6 and FIG. 7, and the first damper parts 20 may be disposed in parallel with the z-axis. The first motion component 2 (the first motion component 2 may refer to FIG. 1, similarly hereinafter) and the base 3 may be disposed at intervals and for example, the plate 21 may be disposed in parallel with the top surface or the bottom surface of the base 3. A first magnet may be disposed on the first motion component 2, a first coil with an iron core may be disposed on the base 3, and the magnetic force generated by the first coil with electricity attract or repel the first magnet such that the first magnet drives the first motion component 2 along the radial direction of the first damper parts 20 relative to the base 3; for example, the first coil drives the first motion component 2 to move along the direction parallel to the x-axis or the y-axis relative to the base 3 such that the first damper parts 20 move along the direction parallel to the x-axis or the y-axis relative to the corresponding first gels 30. The first damper parts 20 may be made of metal materials such as steel or aluminum alloys.

As shown in FIG. 7, the first gels 30 may be semi-solid, and a terminal of each of the first damper parts 20 may move in the corresponding first gel 30. The cross section of the first damper part 20 may be parallel to XoY plane. The number of the first gels 30 may be equal to the number of the first damper parts 20 so that each of the first gels 30 may independently affect the corresponding first damper part 20 to avoid each of the the first damper parts 20 or each of the first gels 30 from being invalid at the same time and improve the reliability of the damper device 1 (the damper device 1 may refer to FIG. 1).

The first damper parts 20 are disposed on the first motion component 2, and the first circular arc edges 200 are disposed on the cross section of the corresponding first damper part 20. The first gels 30 are disposed on the base 3, the base 3 is correspondingly disposed with the first motion component 2, the terminal of each of the first damper parts 20 is inserted into the corresponding first gel 30, the first motion component 2 is configured to drive the first damper parts 20 to move along the radial direction of the first damper parts 20 relative to the first gels 30, and each of the first circular arc edges 200 (from the view of the cross section of one first damper part 20, the first circular arc edge 200 is an arc shape; from the view of the whole of the one first damper part 20, the first circular arc edge 200 forms an arc surface) faces the moving direction of the corresponding first damper part 20. When each of the first damper parts 20 moves in the corresponding first gel 30, because each of the first circular arc edges 200 is not sharp, each of the first circular arc edges 200 do not break the corresponding first gel 30 when having contact with the corresponding first gel 30 so that keeping each of the first damper parts 20 ponding to the corresponding first gel is easier.

As shown in FIG. 7, preferably, the first motion component 2 (the first motion component 2 may refer to FIG. 5) further includes a motion body 23 embedded in the base 3 and first holders 24 connected to the motion body 23 and another terminal of the corresponding first damper parts 20. The motion body 23 includes the plate 21 and the boss 22 which may be embedded in the rectangle through hole 31 of the base 3. The first holders 24 may be connected to the motion body 23 by screws or cement. The number of the first holders 24 is four, and the four first holders 24 are disposed at intervals. The four first holders 24 are respectively disposed on the four right corners of the plate 21. Two first holders 24 on one narrow surface of the motion body 23 and two first holders 24 on another narrow surface of the motion body 23 may be symmetrically disposed with respect to XoZ plane. Similarly, two first holders 24 on one wide surface of the motion body 23 and two first holders 24 on another wide surface of the motion body 23 may be symmetrically disposed with respect to YoZ plane. One 45° chamfered right angle 210 may be disposed on each of the four right corners of the plate 21. One first damper part 20 may be disposed on each of four first holders 24. The first damper parts 20 may be vertically disposed with the motion body 23. Each of the first holders 24 may be integrally formed with the corresponding first damper part 20. Each of the first holders 24 may include a trapezoidal plate 240 of which a upper bottom edge may be flush with the 45° chamfered right angle 210 and a first straight bar 241 which may be vertical to the upper bottom edge of the trapezoidal plate 240, may be located on the middle position of the upper bottom edge of the trapezoidal plate 240, and may be vertically disposed with the first damper part 20. The trapezoidal plate 240 may be fixed on the upper surface of the plate 21.

Figure 8:
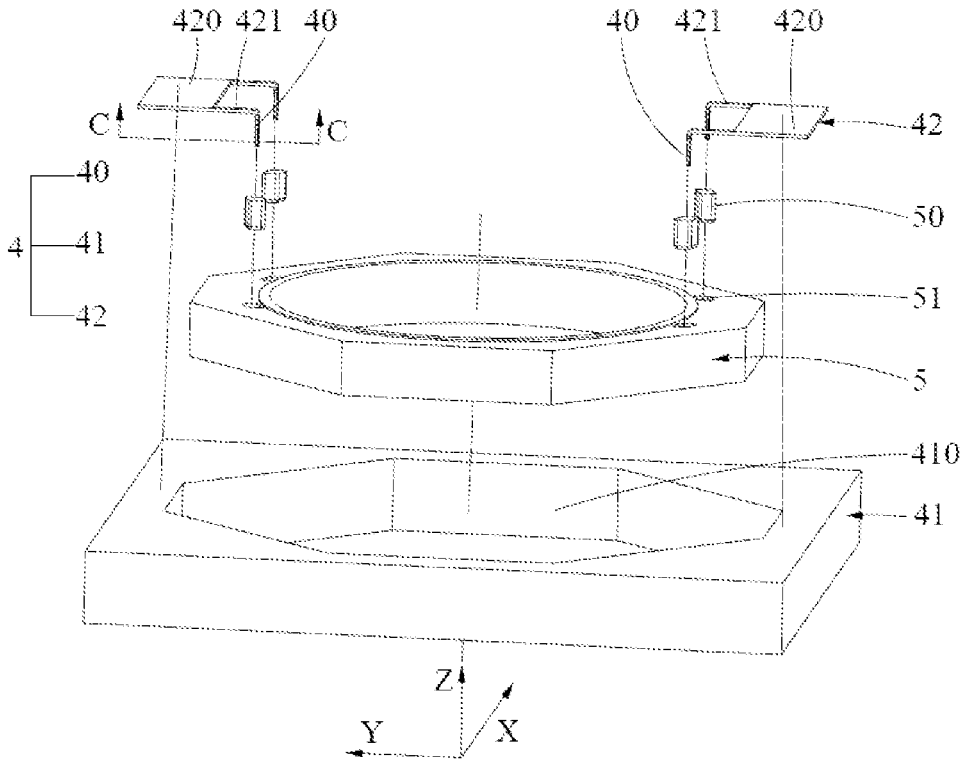
FIG. 8 is an exploded view diagram of a second motion component and a frame according to one embodiment of the present disclosure.

As shown in FIG. 8, preferably, the damper device 1 (the damper device 1 may refer to FIG. 1) further includes: a frame 4 and a second motion component 5. The frame 4 includes a second damper part 40, and the cross section of the second damper part 40 includes a second circular arc edge 400 (the second circular arc edge 400 may refer to FIG. 9, similarly hereinafter). The second motion component 5 includes a second gel 50 and is correspondingly disposed with the frame 4. The terminal of the second damper part 40 is inserted into the second gel 50, the second motion component 5 is configured to drive the second gel 50 to move along the axial direction of the second damper part 40 relative to the second damper part 40, and the second circular arc edge 400 faces the moving direction of the first damper part 20. The first motion component 2 (the first motion component 2 may refer to FIG. 1) and the second motion component 5 may be covered by a case 6 (the case 6 may refer to FIG. 6) after assembled. In some embodiments, the second damper part 40 may also include an arc terminal which may be located on the end of the axial direction of the second damper part 40, may be inserted into the second gel 50, and may face the axial direction of the second damper part 40. For example, the arc terminal may be on the bottom of the second damper part 40. The specific structure of the arc terminal of the second damper part 40 may refer to the arc terminal 203 of the first damper part 20 shown in FIG. 4.

As shown in FIG. 8, four second damper grooves 51 may be disposed on the second motion component 5, and the second gel 50 may be disposed in the second damper groove 51. A second coil with an iron core may be disposed on the frame 4, a second magnet may be disposed on the second motion component 5, and the second coil with electricity drives the second magnet such that the second magnet drives the second motion component 5 along the axial direction of the second damper part 40 relative to the frame 4. For example, the second coil with electricity may drive the second magnet to move along the direction parallel to the z-axis, and the second magnet may drive the second motion component 5 to move along the direction parallel to the z-axis such that the second motion component 5 may drive the second gel 50 to move along the direction parallel to the z-axis relative to the second damper part 40. The second gel 50 may be semi-solid, and a terminal of the second damper part 40 may move in the second gel 50.

As shown in FIG. 8, preferably, the frame 4 further includes a frame body 41 and a second holder 42. The frame body 41 encloses the second motion component 5. The second holder 42 is connected to the frame body 41 and another terminal of the second damper part 40. The frame body 41 may be shown as a rectangular cuboid, and a polygonal through hole 410 is disposed on the middle of the frame body 41. The second motion component 5 may be shown as a polygonal shape and may be embedded in the polygonal through hole 410. The frame body 41 and the second holder 42 may be connected with each other by screws or cement. The second holder 42 is integrally formed with the second damper part 40. The second damper part 40 may be vertical to the frame body 41.

As shown in FIG. 8, preferably, the number of the second damper parts 40 is two, and the two second damper parts 40 are disposed at intervals and are located on the second holders 42. For example, the two second damper parts 40 may be disposed in parallel with each other. The number of the second gels 50 may be equal to the number of the second damper parts 40 so that each of the second gels 50 may independently affect the corresponding second damper part 40 to avoid each of the the second damper parts 40 or each of the second gels 50 from being invalid at the same time and improve the reliability of the damper device 1 (the damper device 1 may refer to FIG. 1). The number of the second holders 42 is two, and the two second holders 42 are respectively disposed on two sides of the frame body 41. For example, the two second holders 42 are disposed face to face with each other (such as being symmetrically disposed with respect to XoZ plane), and the two second holders 42 are located on the edge of the polygonal through hole 410. Each of the two second holders 42 includes a rectangle plate 420 and two second straight bars 421 which are integrally formed with the rectangle plate 420. Each of the two second rectangle plate 420 may be fixed on the upper surface of the frame body 41 and be located on the middle position close to the side surface of the frame body 41. The two second straight bars 421 may be disposed in parallel with each other and vertically to the longer edge of the rectangle plate 420, and each of the two second straight bars 421 is vertically connected to one second damper part 40.

Figure 9:
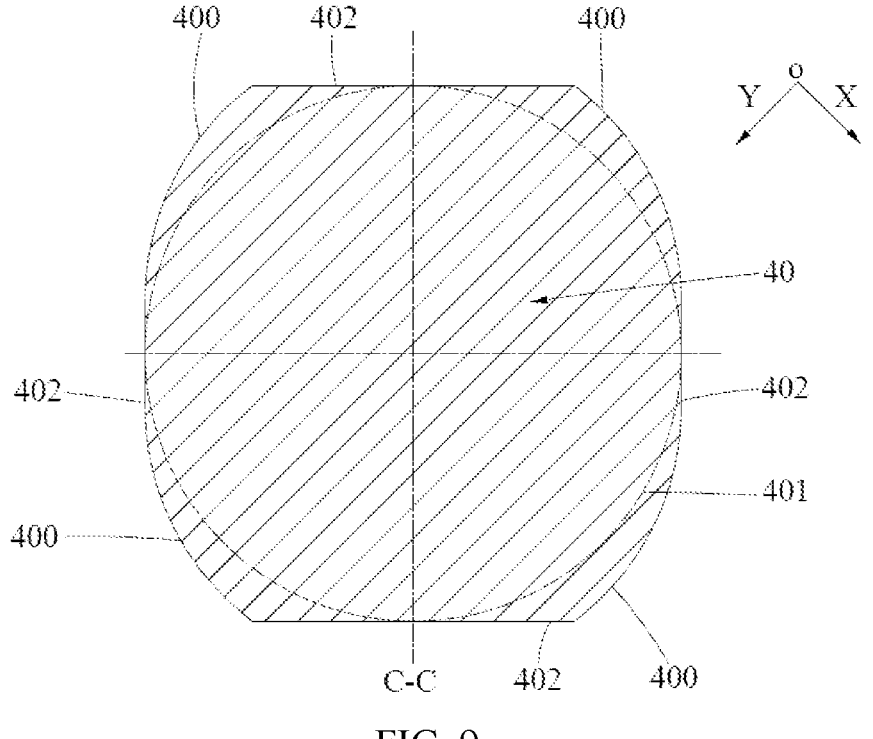
FIG. 9 is a partial cross section view diagram sectioned from C-C line of FIG. 8 according to one embodiment of the present disclosure (merely sectioning a second damper part and regarding the radial direction of the second damper part as the sectioning direction of the C-C line).

Please refer to FIG. 8 and FIG. 9, and the second damper parts 40 may be appear as columnar. The second circular arc edge 400 may be may be the rounded and chamfered edges of the cross section of one of the second damper parts 40, and for example, the second circular arc edge 400 may be the rounded and chamfered edges on the cross section of the existing rectangle damping pin. Each of the second damper parts 40 may be vertically disposed with the frame 4, and for example, the second damper part 40 may be parallel to the z-axis. The second damper part 40 may be made of metal materials such as steel or aluminum alloys. The cross section of the second damper part 40 may be parallel to the XoY plane. Although each of the second gels 50 moves along the axial direction of the corresponding second damper part 40 under a normal state, when the damper device 1 (the damper device 1 may refer to FIG. 1) undergoes collision (such as falling on the ground), each of the second gels 50 moves along the radial direction (such as moving along the direction parallel to the x-axis or the y-axis) of the corresponding first damper part 20 (the first damper part 20 may refer to FIG. 3, similarly hereinafter). Hence, the second circular arc edge 400 faces the moving direction of the corresponding first damper part 20 (for example, the second circular arc edge 400 faces the direction parallel to the x-axis or the y-axis) so that each of the second gels 50 avoids being broken by the corresponding second damper part 40 when moving along the radial direction of the corresponding first damper part 20.

As shown in FIG. 9, preferably, the second circular arc edge 400 may protrude outwards, and for example, the second circular arc edge 400 may protrude in the direction parallel to the x-axis or the y-axis. From the view of the cross section of the second damper part 40, the second circular arc edge 400 is a circular arc; from the view of the whole of the second damper part 40, the second circular arc edge 400 forms a shape with a columnar face. The cross section of the second damper part 40 defines a second incircle 401 (the second incircle 401 in FIG. 9 is shown by a circle formed by a dotted line), and the circumference of the second incircle 401 is less than the circumference of the cross section of the second damper part 40. The second incircle 401 may be a circle with a maximum area formed by rounding and chamfering edges and angles of the cross section of the second damper part 40. The circumference of the second incircle 401 is less than the circumference of the cross section of the second damper part 40 may prevent the second damper part 40 from over rounding and chamfering; In other words, the circumference of the second incircle 401 is equal to or greater than the circumference of the cross section of the second damper part 40 may be avoided. On the contrary, when the circumference of the second incircle 401 is equal to or greater than the circumference of the cross section of the second damper part 40, the sharp edges and angles of the second damper part 40 have been removed by rounding and chamfering to prevent the second damper part 40 from breaking the corresponding second gel 50 (the second gel 50 may refer to FIG. 8, similarly hereinafter), but it would cause the circumference of the cross section of the second damper part 40 to be too small (because the circumference of the cross section of the second damper part 40 is too small, from the view of the whole of the second damper part 40, it causes the side surface area of the second damper part 40 to be too small; in other words, it causes the side surface area of the second damper part 40 for contacting the second gel 50 to be too small), and it would further cause the retarding force generated by the second damper part 40 in the second gel 50 to be reduced such that the frame 4 (the frame 4 may refer to FIG. 8, similarly hereinafter) needs help of other flexible components (e.g., help of connection of springs) to increase the retarding force for meeting requirements and it would make the structure of the damper device 1 (the damper device 1 may refer to FIG. 1) more complicated.

As shown in FIG. 9, preferably, the cross section of the second damper part 40 further includes a second straight edge 402 which connected to the second circular arc edge 400. The number of the second straight edges 402 is four, the number of the second circular arc edges 400 is four, and the four second straight edges 402 and the four second circular arc edges 400 are connected alternately in order to form the cross section of the second damper part 40. From the view of the cross section of the second damper part 40, each of the second straight edges 402 is a line segment; from the view of the whole of the second damper part 40, each of the second straight edges 402 forms a plane. For example, two of the four second straight edges 402 may be parallel to each other, and the other two of the four second straight edges 402 may be parallel to each other. The lengths of the four second circular arc edges 400 are equal, and two terminals of each of the four second circular arc edges 400 may be connected to one second straight edge 402. The second incircle 401 may be tangential to the four second straight edges 402 at the same time. The center of the second incircle 401 may overlap the center of the cross section of the second damper part 40.

Figure 10:
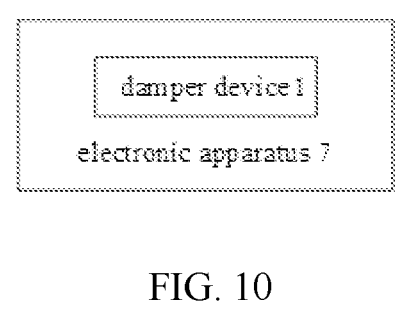

As shown in FIG. 10, the present disclosure in another embodiment further provides an electronic apparatus 7 including the damper device 1 in the aforementioned embodiment. For examples, the electronic apparatus 7 may be an intelligent mobile phone, a digital camera, a dashcam, a wearable device, etc.

The damper device and the electronic apparatus provided by the embodiments of the present disclosure is described in detail by the above description. A person skilled in the art would have changes in specific implementation and application scope according to the idea of the embodiments of the present disclosure. In view of the above description, the content of the present disclosure should not be construed as limitations of the present disclosure, and equivalent modification or changes according to the idea and the spirit of the present disclosure should be construed as being included within the claims of the present disclosure.

LIST OF REFERENCE SIGNS

1: damper device
2: first motion component
20: first damper part
200: first circular arc edge
201: first incircle
202: first straight edge
203: arc terminal
21: plate
210: 45° chamfered right angle
22: boss
23: motion body
24: first holder
240: trapezoidal plate
241: first straight bar
3: base
30: first gel
31: rectangle through hole
32: first damper groove
4: frame
40: second damper part
400: second circular arc edge
401: second incircle
402: second straight edge
41: frame body
410: polygonal through hole
42: second holder
420: rectangle plate
421: second straight bar
5: second motion component
50: second gel
51: second damper groove
6: case
7: electronic apparatus

The invention claimed is:

1. A damper device for a voice coil motor comprising:
a first motion component comprising a first damper part of which a cross section comprises a first circular arc edge; and
a base comprising a first gel and correspondingly disposed with the first motion component, a terminal of the first damper part being inserted into the first gel, the first motion component being configured to drive the first damper part to move along a radial direction of the first damper part relative to the first gel, and the first circular arc edge facing a moving direction of the first damper part.

2. The damper device according to claim 1, wherein the cross section of the first damper part further comprises a first straight edge which connected to the first circular arc edge.

3. The damper device according to claim 2, wherein a number of the first straight edges is four, a number of the first circular arc edges is four, and the four first straight edges and the four first circular arc edges are connected alternately in order to form the cross section of the first damper part.

4. The damper device according to claim 3, wherein the cross section of the first damper part defines a first incircle of which a circumference is less than a circumference of the cross section of the first damper part, and the first incircle is tangential to the four first straight edges.

5. The damper device according to claim 1, wherein the first damper part comprises an arc terminal being located on an end of the first damper part in an axial direction, and the arc terminal is inserted into the first gel and faces the axial direction of the first damper part.

6. The damper device according to claim 1, further comprising:

a frame comprising a second damper part of which a cross section comprises a second circular arc edge; and a second motion component comprising a second gel and correspondingly disposed with the frame, a terminal of the second damper part being inserted into the second gel, the second motion component being configured to drive the second gel to move along an axial direction of the second damper part relative to the second damper part, and the second circular arc edge facing the moving direction of the first damper part.

7. The damper device according to claim 6, wherein the cross section of the second damper part further comprises a second straight edge which connected to the second circular arc edge.

8. The damper device according to claim 7, wherein a number of the second straight edges is four, a number of the second circular arc edges is four, and the four second straight edges and the four second circular arc edges are connected alternately in order to form the cross section of the second damper part.

9. The damper device according to claim 8, wherein the cross section of the second damper part defines a second incircle of which a circumference is less than a circumference of the cross section of the second damper part and the second incircle is tangential to the four second straight edges.

10. The damper device according to claim 6, wherein the frame further comprises a frame body and a second holder, the frame body encloses the second motion component and is connected to the second holder, and the second holder is connected to another terminal of the second damper part.

11. The damper device according to claim 10, wherein a number of the second damper parts is two, and the two second damper parts are disposed at intervals on the second holder.

12. The damper device according to claim 11, wherein a number of the second holders is two, and the two second holders are respectively disposed on two sides of the frame body.

13. An electronic apparatus comprising a damper device for a voice coil motor, the damper device comprising:

a first motion component comprising a first damper part of which a cross section comprises a first circular arc edge; and a base comprising a first gel and correspondingly disposed with the first motion component, a terminal of the first damper part being inserted into the first gel, the first motion component being configured to drive the first damper part to move along a radial direction of the first damper part relative to the first gel, and the first circular arc edge facing a moving direction of the first damper part.

* * * * *